United States Patent
Robertson (10) Patent No.: US 9,552,137 B2
(45) Date of Patent: Jan. 24, 2017

(54) SYSTEM AND METHOD FOR MANAGING INFORMATIONAL OBJECTS ON MOBILE DEVICES

(71) Applicant: BLACKBERRY LIMITED, Waterloo (CA)

(72) Inventor: Ian M. Robertson, Waterloo (CA)

(73) Assignee: BLACKBERRY LIMITED, Waterloo (CA)

(*) Notice: Subject to any disclaimer, the term of this patent is extended or adjusted under 35 U.S.C. 154(b) by 463 days.

(21) Appl. No.: 14/018,962

(22) Filed: Sep. 5, 2013

(65) Prior Publication Data
US 2014/0006969 A1  Jan. 2, 2014

Related U.S. Application Data

(63) Continuation of application No. 10/892,127, filed on Jul. 16, 2004, now Pat. No. 8,554,844.

(51) Int. Cl.
   *G06F 3/0482*  (2013.01)
   *G06F 17/30*  (2006.01)

(52) U.S. Cl.
   CPC ....... *G06F 3/0482* (2013.01); *G06F 17/30905* (2013.01)

(58) Field of Classification Search
   CPC .......................... G06F 3/0482; G06F 17/30905
   See application file for complete search history.

(56) References Cited

U.S. PATENT DOCUMENTS

| | | |
|---|---|---|
| 5,465,358 A | 11/1995 | Blades et al. |
| 6,424,829 B1 | 7/2002 | Kraft |
| 6,603,984 B2 | 8/2003 | Kanefsky |
| 7,047,027 B2 | 5/2006 | Jeon |
| 2002/0087584 A1 | 7/2002 | Hung |
| 2003/0078981 A1* | 4/2003 | Harms ................. G06Q 10/107 709/206 |
| 2003/0163537 A1 | 8/2003 | Rohall et al. |
| 2004/0015547 A1 | 1/2004 | Griffin et al. |
| 2004/0110491 A1 | 6/2004 | Ozaki |

(Continued)

FOREIGN PATENT DOCUMENTS

| | | |
|---|---|---|
| CA | 2511054 C | 6/2011 |
| EP | 0982959 A | 3/2000 |

(Continued)

OTHER PUBLICATIONS

Prosecution Documents for U.S. Appl. No. 10/892,127.

(Continued)

*Primary Examiner* — Joe Chacko
(74) *Attorney, Agent, or Firm* — Perry + Currier Inc.

(57) ABSTRACT

A system and method for managing informational objects on a mobile device. A user-selectable option is displayed to a user of the mobile device. The option is associated with an action to be performed on informational objects sharing at least one specified characteristic (e.g., storing all e-mail messages that are part of the same thread in a folder, generating a distribution list of contacts belonging to a specified group). After the user has selected the option, the application identifies informational objects having the at least one specified characteristic and performs the action on the identified objects.

10 Claims, 10 Drawing Sheets

(56) References Cited

U.S. PATENT DOCUMENTS

| | | | |
|---|---|---|---|
| 2004/0119755 A1* | 6/2004 | Guibourge | G06F 3/0482 |
| | | | 715/827 |
| 2005/0004990 A1 | 1/2005 | Durazo et al. | |
| 2005/0125496 A1* | 6/2005 | Thuerk | H04L 12/581 |
| | | | 709/204 |
| 2005/0144157 A1 | 6/2005 | Moody et al. | |
| 2005/0223067 A1 | 10/2005 | Buchheit et al. | |
| 2005/0228864 A1 | 10/2005 | Robertson | |
| 2005/0262203 A1 | 11/2005 | Buchheit et al. | |
| 2007/0198639 A1 | 8/2007 | Litwin et al. | |

FOREIGN PATENT DOCUMENTS

| | | | |
|---|---|---|---|
| EP | 1617637 A1 | 1/2006 | |
| HK | 1086413 A1 | 5/2008 | |

OTHER PUBLICATIONS

Canadian Patent Application No. 2,511,054. Notice of Allowance dated Oct. 8, 2010.
Canadian Patent Application No. 2,511,054. Office Action dated Jul. 30, 2009.
Canadian Patent Application No. 2,511,054. Office Action dated Apr. 2, 2008.
Hong Kong Patent Application No. 06107180.9. Certificate of Grant dated May 9, 2008.
Prosecution Documents for European Patent Application No. 04103404.2.
Cheng, Li-Te et al., "A Mobile User Interface for Threading, Marking, and Previewing Email", Collaborative User Experience Group, IBM T.J. Watson Research Center, Cambridge, MA.

* cited by examiner

SYSTEM AND METHOD FOR MANAGING INFORMATIONAL OBJECTS ON MOBILE DEVICES

CROSS-REFERENCE TO RELATED APPLICATIONS

This application is a continuation of, and claims priority to, prior U.S. patent application Ser. No. 10/892,127, filed on Jul. 16, 2004, the entirety of which is hereby incorporated by reference.

FIELD OF THE INVENTION

The present invention relates generally to software applications for mobile devices, and more specifically to the management of informational objects, such as electronic mail messages for example, in an application for a mobile device.

BACKGROUND OF THE INVENTION

Electronic mail ("e-mail") applications for mobile devices are typically provided as scaled-down versions of e-mail applications designed for desktop computing devices. The limited resolution and small screens of mobile devices can, however, affect the relative ease with which certain tasks are performed by users of e-mail applications for mobile devices.

For example, when e-mail messages are to be managed by a user, certain operations that might otherwise be routinely performed through the interface of a desktop version of an e-mail application (e.g., navigating multiple windows or display sections within a window when browsing the contents of multiple messages, or navigating lengthy message lists) may not be supported by e-mail applications for mobile devices. Even where such operations are supported, they may not be performed as efficiently through the interface provided, due to limitations in screen size, processing and storage capabilities, and functionality of input mechanisms typically provided by a mobile device, for example.

Accordingly, in the management of e-mail messages and other types of informational objects in an application for a mobile device, it is typically desirable to provide means for users to perform certain tasks in a manner that requires minimal user input and minimal user manipulation of displayed objects. This can increase the ease and efficiency with which such tasks may be performed by a user.

SUMMARY OF THE INVENTION

In a broad aspect of the invention, there is provided a method of managing a plurality of informational objects, the method performed by an application executing on a mobile device, the method comprising the steps of: displaying a user-selectable option to a user of the mobile device, the option associated with an action to be performed on informational objects sharing at least one specified characteristic; determining when the user has selected the option; identifying a subset of the plurality of informational objects, each object of the subset having the at least one specified characteristic associated therewith; and performing the action on the subset of objects; wherein the identifying and performing steps are performed by the application after determining that the user has selected the option.

In another broad aspect of the invention, there is provided a system for managing a plurality of informational objects, comprising: means for displaying a user-selectable option to a user of the mobile device, the option associated with an action to be performed on informational objects sharing at least one specified characteristic; means for determining when the user has selected the option; means for identifying a subset of the plurality of informational objects after determining that the user has selected the option, each object of the subset having the at least one specified characteristic associated therewith; and means for performing the action on the subset of identified objects.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Several embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
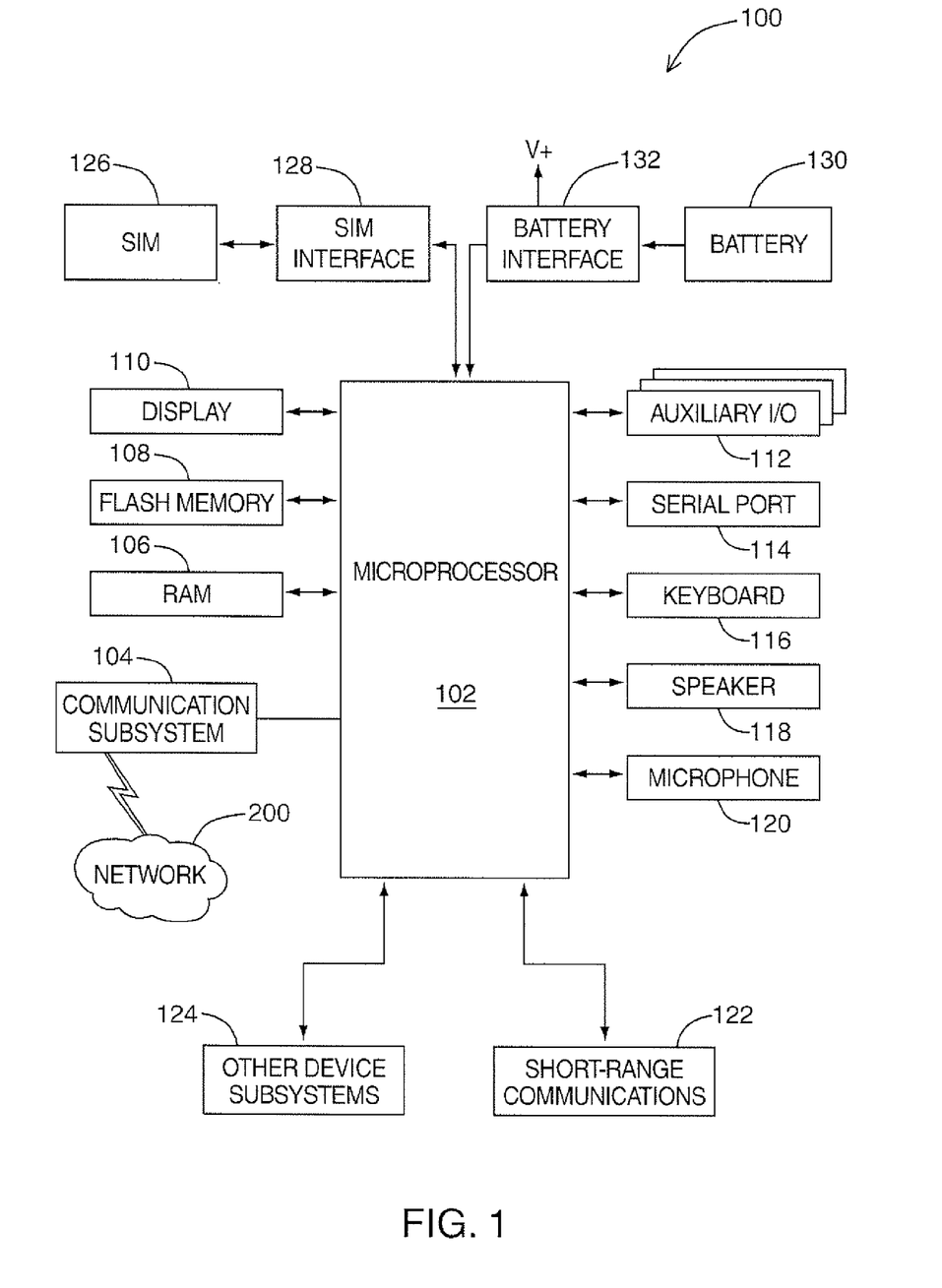
FIG. 1 is a block diagram of a mobile device in one example implementation.
Figure 2:
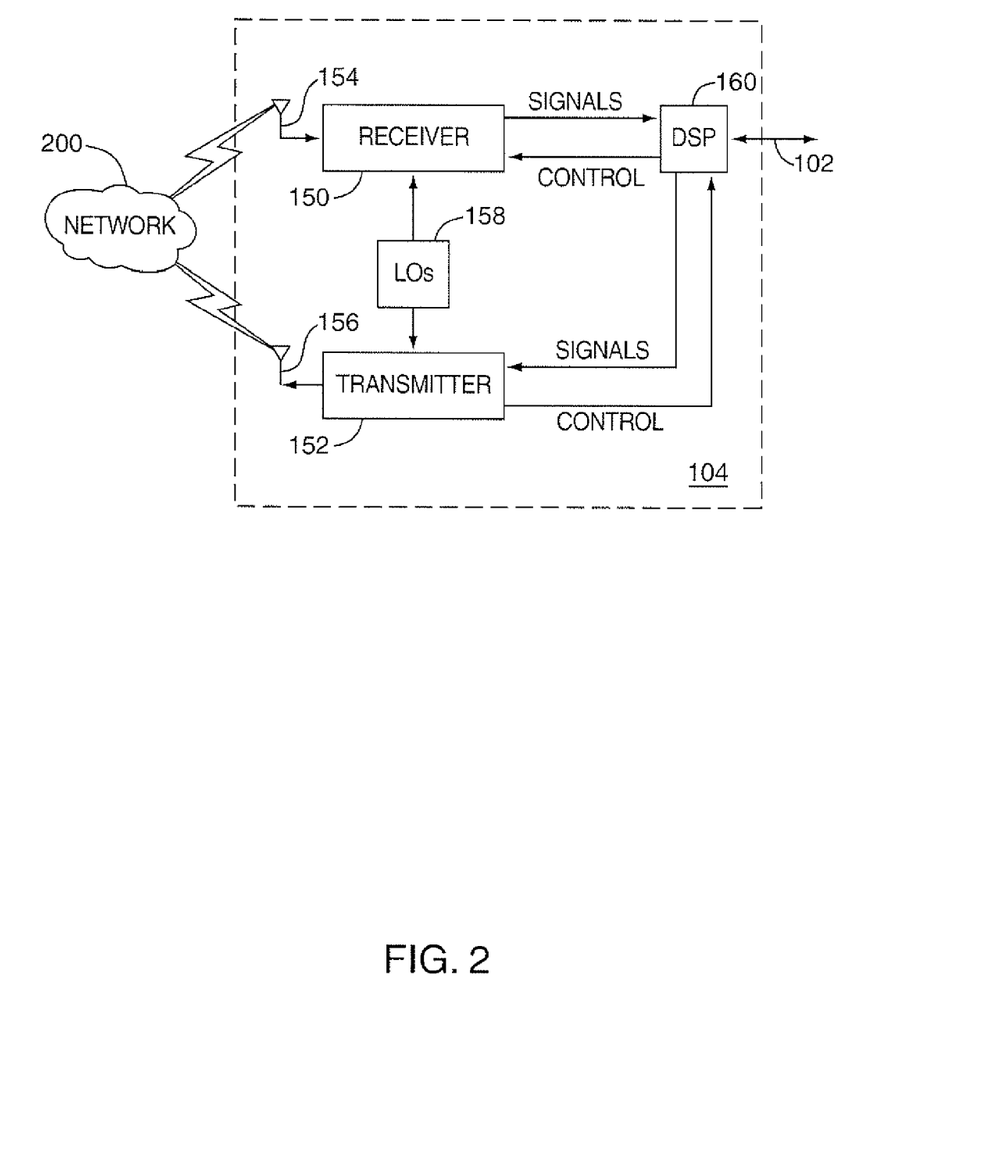
FIG. 2 is a block diagram of a communication subsystem component of the mobile device of FIG. 1.
Figure 3:
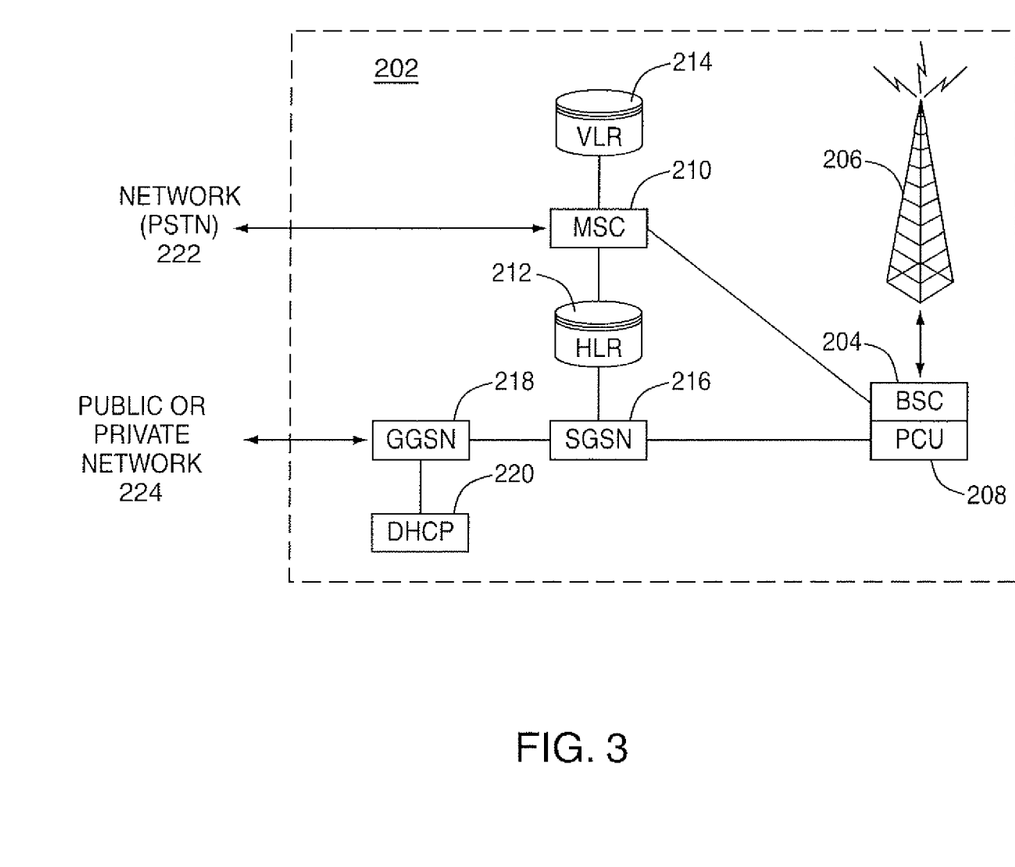
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS)

standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as email, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. An RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as ISDN addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-in User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPSec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of the invention relate generally to a system and method for managing a plurality of informational objects. The method for managing informational objects is performed by an application executing on a mobile device (e.g., a PIM for mobile device 100 as described with reference to FIG. 1, or other software application). Embodiments of the invention enable users to perform certain tasks with minimal user input and minimal user manipulation of displayed objects. This can increase the ease and efficiency with which such tasks may be performed by users.

Figure 4:
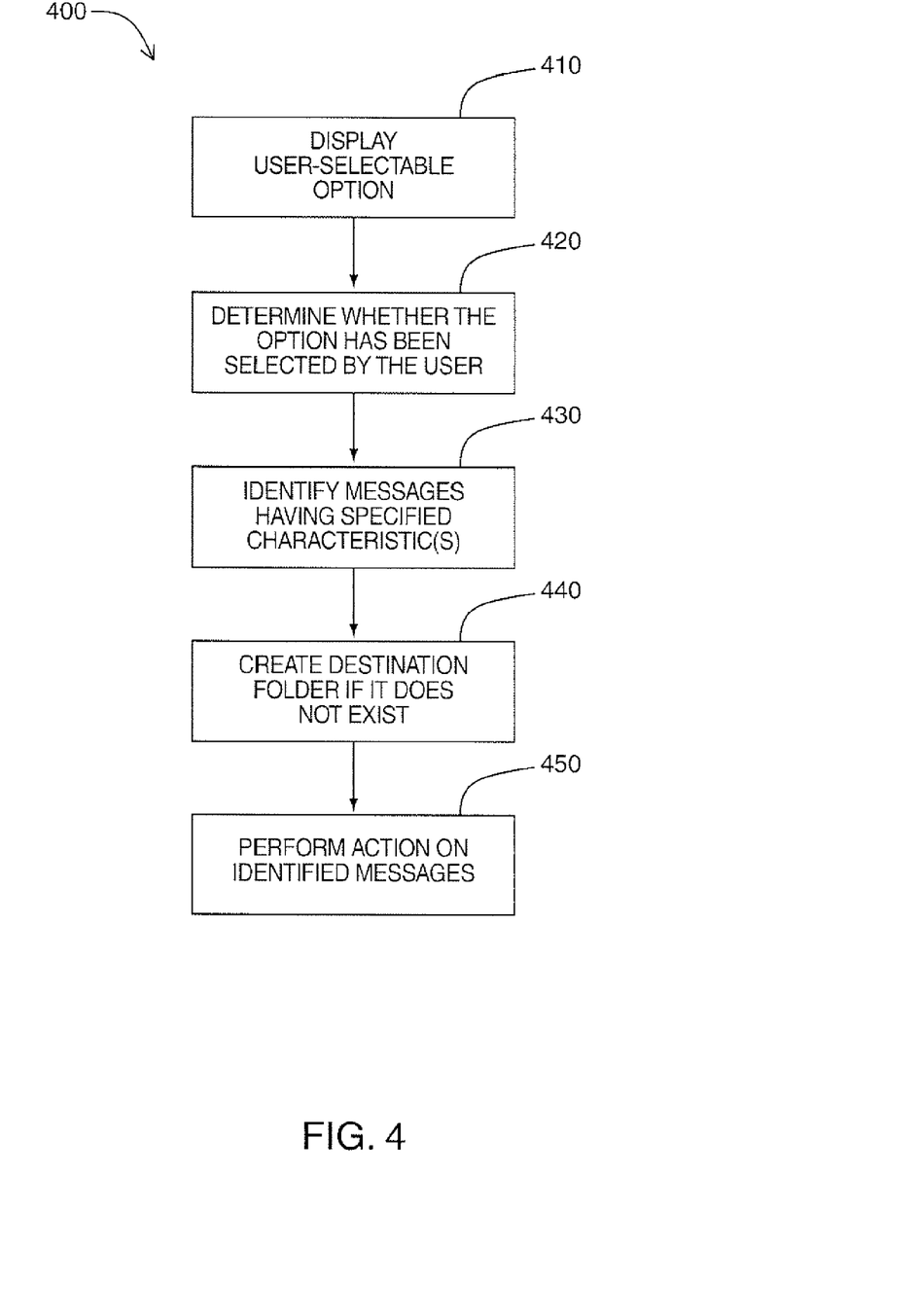
FIG. 4 is a flowchart illustrating steps of a method of managing informational objects in an embodiment of the invention.

Referring to FIG. 4, a flowchart illustrating steps of a method of managing informational objects in an embodiment of the invention is shown generally as 400.

At step 410, a user-selectable option is displayed by the application to a user of the mobile device. The option is associated with a pre-defined action that can be performed on specific types of informational objects.

For example, in one embodiment of the invention, the informational objects are e-mail messages, and the user may be provided with the option to gather all e-mail messages located in one or more folders (e.g., an "Inbox") which are part of the same e-mail conversation thread, and to subsequently store all such messages in a separate folder. This can facilitate more efficient organization of e-mail messages and easier review of the messages belonging to that thread.

The option to perform this action may be displayed in a menu along with other options for performing different actions relating to e-mail management and/or with other options relating to other tasks. The display of the menu may be triggered, for example, by a user invoking a drop down menu when viewing a specific e-mail message (e.g., from a toolbar, or by right-clicking the message). In this case, selection of the option by the user to move all messages of a thread to a folder would initiate the storage of all messages that belong to the same thread as the message being viewed in the folder.

As a further example, the display of the menu may be triggered by a user invoking a drop down menu after selecting a message from a displayed grouping of messages (e.g., presented as a list of message headers or descriptions, or some other graphical representation of multiple messages) being viewed. In this case, selection of the option by the user to move all messages of a thread to a folder would initiate the storage of all messages that belong to the same thread as the message selected from the grouping in the folder.

The action initiated upon selection of the option displayed to a user is performed on informational objects sharing at least one specified characteristic. In one embodiment of the invention, the action is performed on e-mail messages that are part of the same thread. The manner in which these messages are identified may be predefined within the application. For example, all messages that share some common text in their subject field (e.g. by matching text in the subject field after stripping away leading "re:" identifiers), or that share common addressees may be considered by the application to be part of the same thread. Other techniques to identify messages upon which the action is to be performed may be employed.

In variant embodiments of the invention, the application may permit the user to specify one or more characteristics associated with messages, for use in identifying the messages upon which the action is to be performed.

In one embodiment of the invention, the action to be performed on messages that are part of the same thread comprises storing the messages of the thread in a folder (e.g., in a folder having the same name as the shared text of messages in their subject field). However, it will be understood by persons skilled in the art that other actions may be additionally or alternatively supported. For example, the action to be performed on messages sharing a specified characteristic may comprise deleting all such messages. This may facilitate, for example, efficient deletion of all "out-of-office reply" messages from a large number of messages. In this example, the messages to be deleted need not belong to the same thread. All messages that contain an "out-of-office"

phrase in the subject field may be deleted, although the text of the subject field may very greatly from message to message.

At step 420, a determination of whether or not the option displayed at step 410 has been selected by the user is made. In selecting the option, the user may be prompted for additional information, depending on the nature of the option provided. For example, the option may be associated with storing all messages that are part of the same thread as the message currently being viewed or selected in a user-identified destination folder. In prompting the user for a destination folder, a file directory may be displayed to the user to facilitate selection of a specific folder. By way of further example, the user may be prompted to identify one or more source folders, which are to be searched for messages that may be identified as being part of the same thread as the message currently being viewed or selected.

In other embodiments of the invention, however, a default destination folder may be pre-defined in the application, or a technique to determine the specific destination folder in which the messages are to be stored (e.g., requiring that a folder having the same name as the shared text of messages in their subject field) may be employed, so that such additional information need not be obtained from the user. Similarly, one or more default source folders to be searched may also be pre-defined (e.g. a user's "Inbox"). Such implementations may provide certain efficiencies in that user input will typically be minimized in order to initiate the desired action.

At step 430, messages having the at least one specified characteristic associated therewith are identified in response to the selection of the option by the user as determined at step 420. One or more source folders are searched to identify such messages by the application.

At step 440, in the embodiment of the invention where messages identified at step 430 are to be moved to a specific destination folder, the folder may be created automatically by the application if it does not already exist. As the user need not explicitly create the destination folder, this may facilitate more efficient performance of the desired action.

At step 450, the desired action is performed on the messages identified at step 430. Where messages are to be moved to a destination folder, this step may comprise copying or moving the identified messages to the destination folder. In variant embodiments of the invention, other actions to be performed on identified messages may be implemented.

Steps 430 through 450 are performed by the application automatically after determining that the user has selected the option. This will generally permit the desired action to be performed more efficiently. For example, in moving multiple e-mail messages that are part of the same thread to a specified folder, a user is no longer required to manually sort messages by originator, sender, date and/or subject line, individually select the messages as a group, create a destination folder, and move or drag the selected group of messages to the destination folder. Requiring the user to initiate each of these individual tasks manually could be time consuming and cumbersome, particularly when performed on a mobile device. In contrast, in accordance with an embodiment of the invention, such tasks are performed automatically by the application, and the desired action may be completed without requiring further user input after the option is selected.

Referring to FIGS. 5A-5D, examples of screenshots of a user interface provided by an application executing on a mobile device in accordance with an embodiment of the invention are illustrated. These screenshots are provided only as examples to facilitate better understanding of one embodiment of the invention, and are not to limit the scope of the invention. It will be understood by persons skilled in the art that different displays may be provided in variant implementations of embodiments of the invention.

Figure 5A:
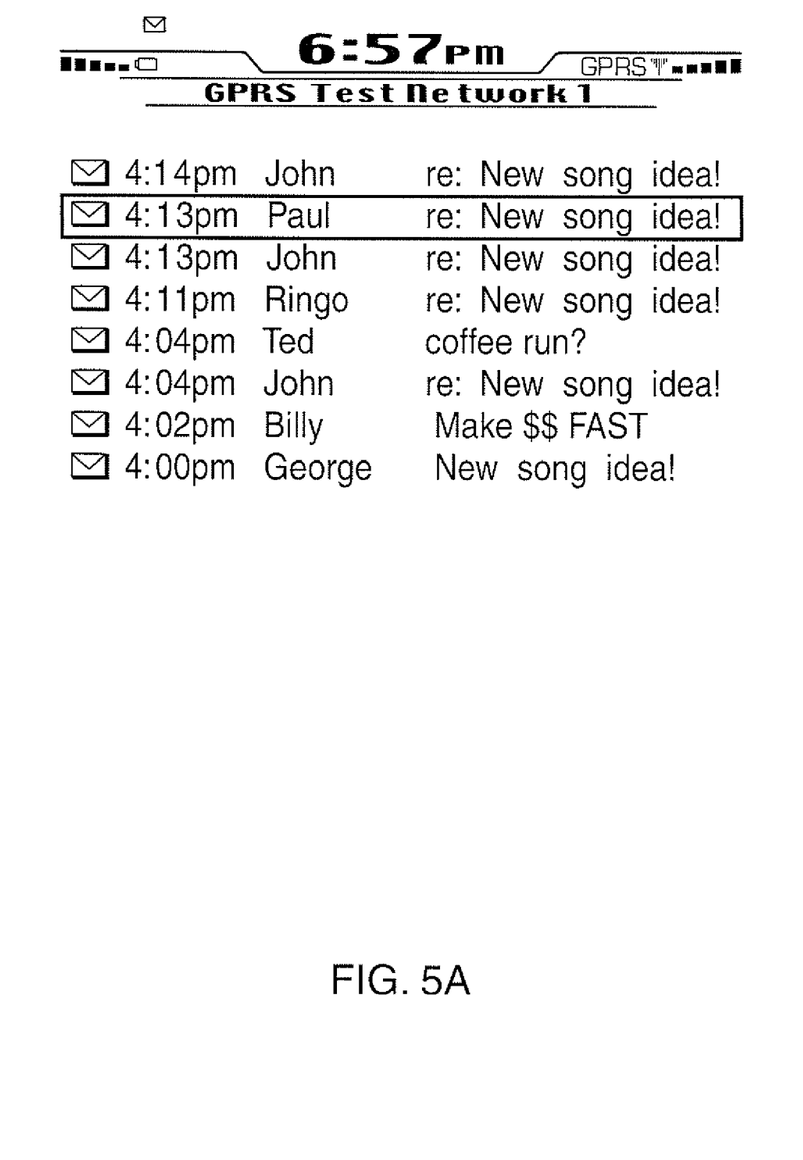
FIGS. 5A-5D illustrate examples of screenshots of a user interface provided by an application executing on a mobile device in accordance with an embodiment of the invention.

FIG. 5A illustrates a partial list of e-mail messages displayed on a mobile device. A specific e-mail message belonging to a thread based on the subject "New song idea!" has been selected by the user from the list.

Figure 5B:
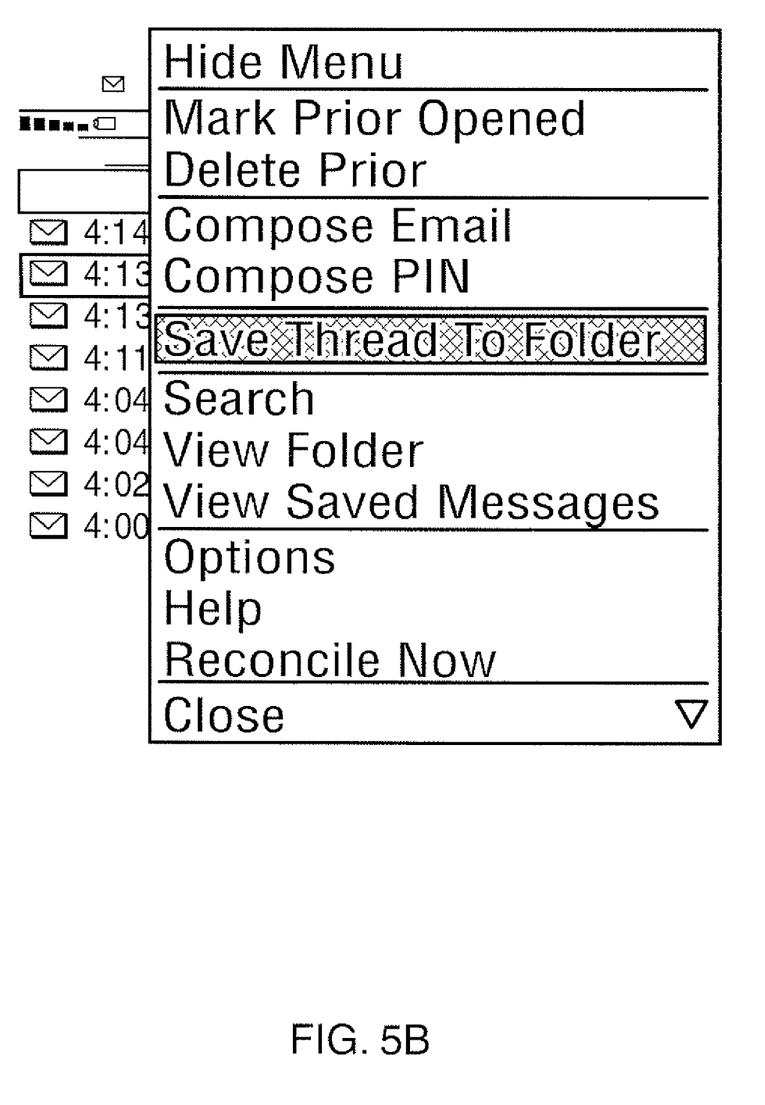

FIG. 5B illustrates a drop down menu that is displayed to the user after the user has right-clicked the selected e-mail message. The option "Save Thread to Folder" is displayed in the menu.

Figure 5C:
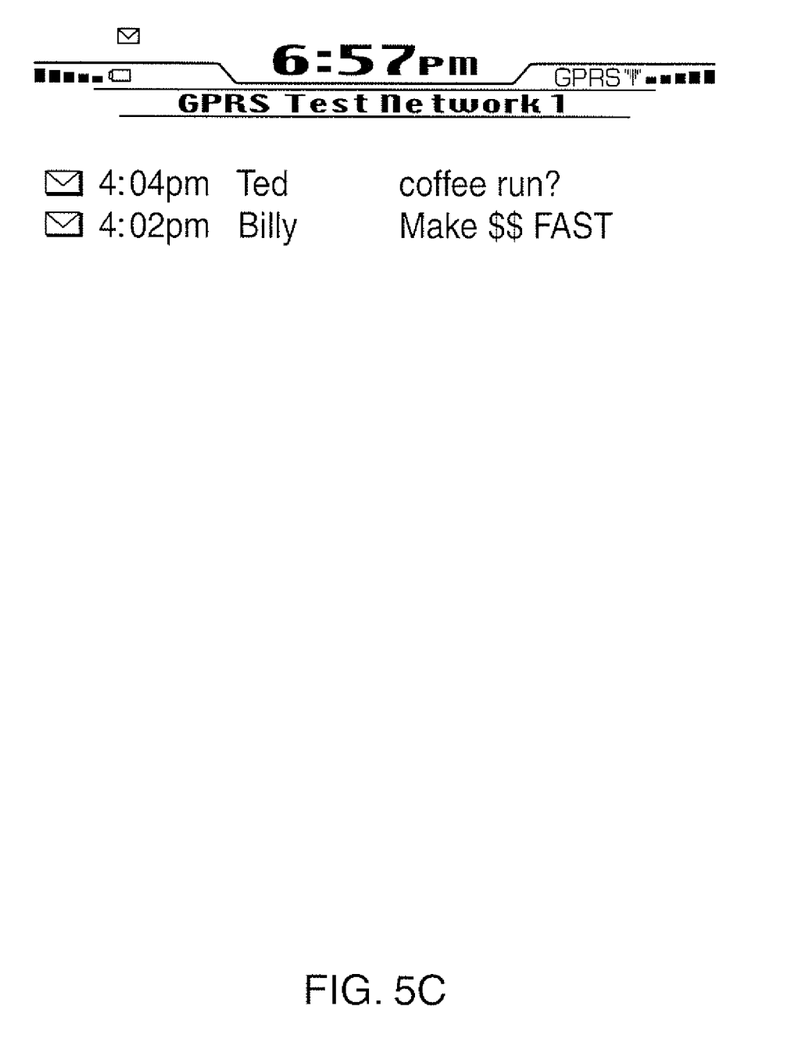

FIG. 5C illustrates the partial list of e-mail messages of FIG. 5A after the option "Save Thread to Folder" was selected by the user. The messages that are part of the same thread as the selected e-mail message has been deleted from the list.

Figure 5D:
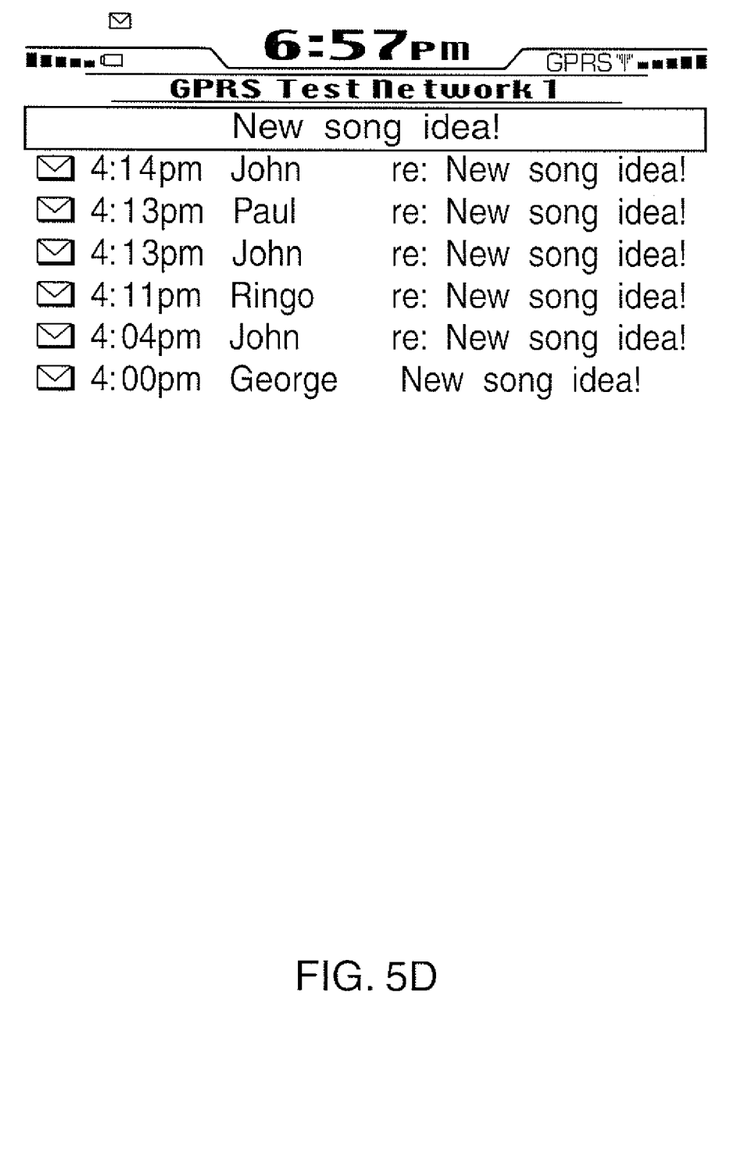

FIG. 5D illustrates the contents of a new destination folder entitled "New song idea!" that was created to store the e-mail messages of the corresponding thread.

It will be understood by persons skilled in the art that the term "thread" as used herein may refer to a thread or a subthread of a longer thread, and each respective thread or subthread may or may not contain subthreads.

Similarly, the term "folder" as used herein may refer to a folder or a subfolder of a parent folder, and each respective folder or subfolder may or may not contain subfolders.

In the foregoing description, the invention has primarily been described with respect to embodiments in which the informational objects being managed are e-mail messages. However, in variant embodiments of the invention, other informational objects may also be managed, as shown generally with reference to FIG. 6.

Figure 6:
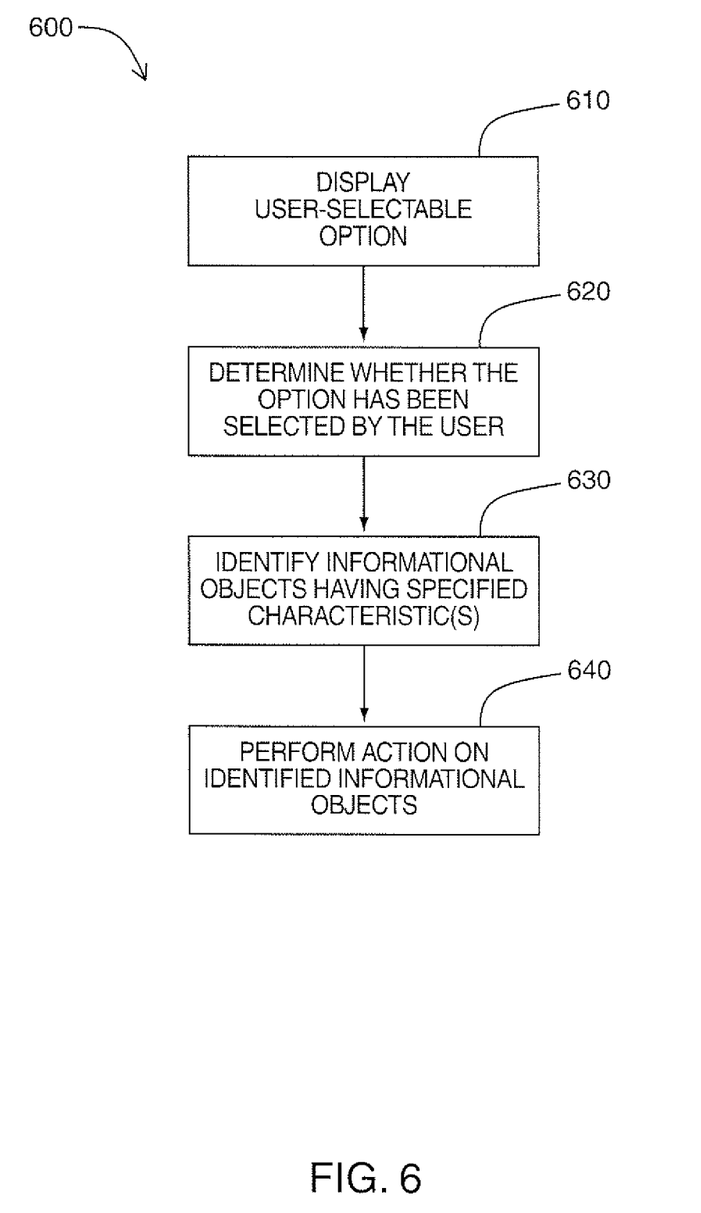
FIG. 6 is a flowchart illustrating steps of a method of managing informational objects in another embodiment of the invention.

Referring to FIG. 6, a flowchart illustrating steps of a method of managing informational objects in another embodiment of the invention is shown generally as 600. At step 610, a user-selectable option is displayed by the application to a user of the mobile device. The option is associated with a pre-defined action that can be performed on the informational objects. At step 620, a determination of whether or not the option displayed at step 610 has been selected by the user is made. In selecting the option, the user may be prompted for additional information, depending on the nature of the option provided. At step 630, informational objects having the at least one specified characteristic associated therewith are identified in response to the selection of the option by the user as determined at step 620. At step 640, the desired action is performed on the informational objects identified at step 630.

Figure 7:
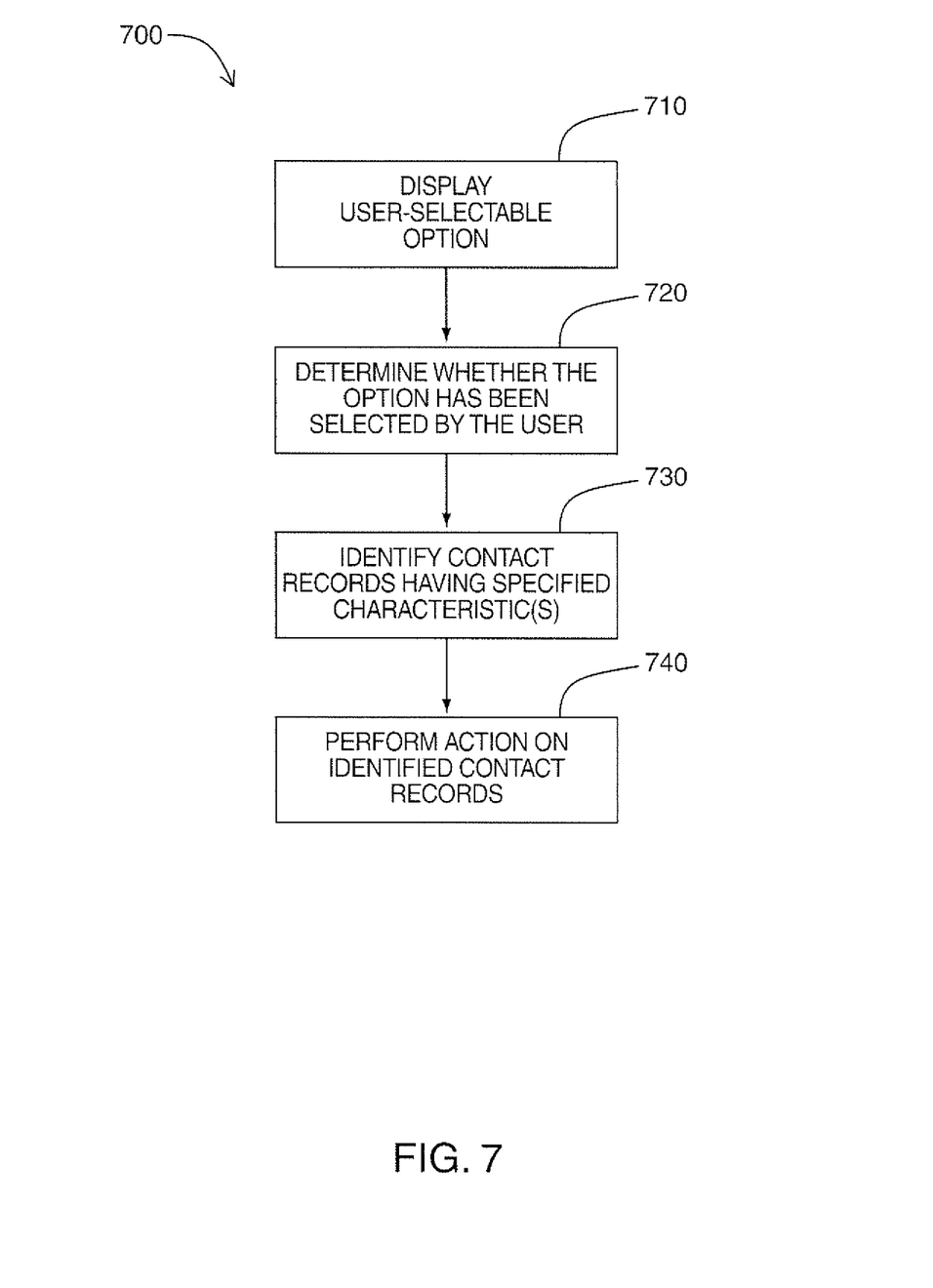
FIG. 7 is a flowchart illustrating steps of a method of managing informational objects in another embodiment of the invention.

For example, the informational objects referred to in FIG. 6 are contact records in variant embodiments of the invention, as shown in FIG. 7. Steps 710 to 740 of FIG. 7 correspond to steps 610 to 640 of FIG. 6 respectively. Various actions may be defined, to be performed by the application on contact records. For instance, a distribution list of related contacts based on the contact records may be created by an application of a mobile device in accordance with one such embodiment. Upon selection of a user-selectable option displayed to the user of the mobile device, a plurality of contact records may be searched to identify contact records that share at least one specified characteristic (e.g., contacts belonging to the same company, or some other user-defined group). An e-mail distribution list may then be automatically generated based on such identified contact records.

While the steps of methods 400, 600 and 700 describe embodiments of the invention where one user-selectable option associated with one pre-defined action that can be performed on specific types of informational objects is provided, it will be understood by persons skilled in the art that the user-selectable option provided may be one of multiple user-selectable options that can be displayed to and selected by a user, where each of the multiple user-selectable options corresponds to a different pre-defined action that can be performed on informational objects. The different pre-defined actions may be associated with one type or with different types of informational objects.

It will be understood by persons skilled in the art from the foregoing description that embodiments of the invention need not be limited to implementations within an e-mail application or within an application primarily providing e-mail capabilities. In variant embodiments, the invention may be implemented within other types of applications, including contact and scheduling management applications and news reader applications, for example.

The steps of a method of managing informational objects to be performed by an application on a mobile device in embodiments of the invention may be provided as executable software instructions stored on computer-readable media, which is intended to include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method comprising:
displaying a user-selectable option in an email application on a display of a mobile device, the option associated with an action to generate an email distribution list from contact records stored at the mobile device;
in response to detecting selection of the user-selectable option in the email application:
displaying a prompt for additional information in the email application on the display of the mobile device; and receiving at least one specified characteristic in response to the prompt;
searching the contact records to identify the contact records that share the at least one specified characteristic, wherein the at least one specified characteristic shared by identified contact records comprises the identified contact records belonging to a user-defined group; and
generating the email distribution list based on the identified contact records.

2. The method of claim 1, wherein the displaying the user-selectable option is performed in response to a user invocation to display a menu of user-selectable options.

3. The method of claim 1, wherein the generating comprises adding contact information from each of the identified contact records to the email distribution list.

4. The method of claim 1, wherein the user-defined group comprises a same company.

5. A non-transitory computer-readable medium storing a computer program, wherein the execution of the computer program is for:
displaying a user-selectable option in an email application on a display of a mobile device, the option associated with on action to generate an email distribution list from contact records stored at the mobile device;
in response to detection of selection of the user-selectable option in the email application:
displaying a prompt for additional information in the email application on the display of the mobile device; and receiving at least one specified characteristic in response to the prompt;
searching the contact records to identity the contact records that share the at least one specified characteristic, wherein the at least one specified characteristic shared by identified contact records comprises the identified contact records belonging to a user-defined group; and
generating the email distribution list based on the identified contact records.

6. The non-transitory computer-readable medium of claim 5, wherein execution of the computer program is further for generating the email distribution list based on the identified contact records by adding contact information from each of the identified contact records to the email distribution list.

7. A mobile device comprising a processor, a display, and a memory storing contact records and a plurality of instructions which, when executed by the processor, configure the processor to:
display a user-selectable option in an email application on a display of a mobile device, the option associated with an action to generate an email distribution list from contact records;
in response to detection of selection of the user-selectable option in the email application:
display a prompt for additional information in the email application on the display of the mobile device; and receiving at least one specified characteristic in response to the prompt;
search the contact records to identity the contact records that share the at least one specified characteristic, wherein the at least one specified characteristic shared by identified contact records comprises the identified contact records belonging to a user-defined group; and
generate the email distribution list based on the identified contact records.

8. The device of claim 7, wherein the processor is further configured to display the user-selectable option in response to a user invocation to display a menu of user-selectable options.

9. The device of claim 7, wherein the processor is further configured to generate the email distribution list by adding contact information from each of the identified contact records to the email distribution list.

10. The device of claim 7, wherein the user-defined group comprises a same company.

* * * * *